United States Patent [19]

Braetsch et al.

[11] Patent Number: 5,093,289

[45] Date of Patent: Mar. 3, 1992

[54] CERAMIC MATERIAL PERMITTING THE PASSAGE OF FLUIDS AND BASED ON SILICON POWDER REACTION-BONDED IN THE PRESENCE OF CARBON

[75] Inventors: Volker Braetsch; Josef Dietl, both of Neuotting; Gerald Nitzl, Waldkraiburg; Klaus Liethschmidt, Frechen, all of Fed. Rep. of Germany

[73] Assignee: Heliotronic Forschungs- und Entwicklungsgesellschaft fur Solarzellen-Grundstoffe mbH, Burghausen, Fed. Rep. of Germany

[21] Appl. No.: 311,069

[22] Filed: Feb. 14, 1989

[30] Foreign Application Priority Data

Apr. 12, 1988 [DE] Fed. Rep. of Germany ....... 3812156

[51] Int. Cl.$^5$ ............................................. C04B 38/00
[52] U.S. Cl. ....................................... 501/80; 501/154; 210/510.1; 502/232; 502/439; 428/613; 266/220; 266/227; 264/56; 264/59
[58] Field of Search ................. 501/80, 81, 82, 154; 210/510.1; 264/56, 29.4, 44, 59; 427/228; 502/178, 232, 439; 428/613; 266/220, 227, 229

[56] References Cited

U.S. PATENT DOCUMENTS

| | | | |
|---|---|---|---|
| 4,265,659 | 5/1981 | Blome | 501/80 |
| 4,477,493 | 10/1984 | Parkinson et al. | 264/29.4 |
| 4,564,496 | 1/1986 | Gupta et al. | 264/44 |
| 4,597,923 | 7/1986 | Kennedy | 423/345 |
| 4,774,217 | 9/1988 | Takeuchi et al. | 502/178 |
| 4,940,684 | 7/1990 | Okutani et al. | 502/178 |

FOREIGN PATENT DOCUMENTS

| | | |
|---|---|---|
| 3516587 | 10/1985 | Fed. Rep. of Germany ...... 502/178 |
| 2201711 | 4/1974 | France . |
| 8800933 | 2/1988 | PCT Int'l Appl. . |
| 1004352 | 9/1965 | United Kingdom . |
| 2105316 | 3/1983 | United Kingdom . |

OTHER PUBLICATIONS

Chemical Abstracts, 109, 1988, 237, 26695z.
Columbus, Ohio, U.S.=JP-A-63-74-962.
Chemical Abstracts, 103, 1985, 233, 26199s.
Columbus, Ohio, U.S.=JP-A-60 33 272.
"Manufacture and Application of Highly Porous Nonoxide Ceramics", pp. 468-470, 472, *Ceramic Forum International*, V. Braetsch et al., 1989.

*Primary Examiner*—William R. Dixon, Jr.
*Assistant Examiner*—Paul Marcantoni
*Attorney, Agent, or Firm*—Collard, Roe & Galgano

[57] ABSTRACT

A ceramic material made of a skeleton reaction-bonded silicon powder is distinguished by an open-cell pore structure produced by using a matrix of an appropriately shaped polyurethane foam structure. For the preparation, a foam matrix is coated with a suspension of silicon powder, synthetic resin and solvent and is subjected to a heat treatment, during which the foam matrix is expelled and the silicon is stabilized. The thermally and chemically stable product can be used, for example, as a filter medium for metal melts, as a catalyst carrier, or as a boundary medium between the flame zone and unignited combustible mixtures in burners.

11 Claims, No Drawings

CERAMIC MATERIAL PERMITTING THE PASSAGE OF FLUIDS AND BASED ON SILICON POWDER REACTION-BONDED IN THE PRESENCE OF CARBON

BACKGROUND OF THE INVENTION

1. Field of the Invention

This invention relates to a ceramic material based on silicon powder reaction-bonded in the presence of carbon, which material permits the passage of fluids, its use and process for its preparation.

2. Description of the Prior Art

German publication DE-A-34 40 364 discloses a material which is based on silicon powder reaction-bonded in the presence of carbon and in which silicon particles are mixed with an organic binder. A molding is formed from the mixture and is subjected to a final heat treatment during which the organic substance carbonizes and the remaining silicon skeleton containing small amounts of carbon is stabilized by reaction-bonding. It is also possible to produce a porous structure if the silicon powder is initially taken in a particle size distribution which permits an appropriately loose and permeable bed. However, the porosity of the resulting material is, in the end, always related to the size of the silicon particles used, so that open-pore structures having pore diameters in the range from 0.1 to 10 mm require the use of relatively large silicon particles. The use of such large particles results in, on the one hand, a reduction in the mechanical stability of the product and, on the other hand, a disadvantageous ratio of pore volume to total volume. Thus, this material has advantages mainly in the fine-pore range.

German publication DE-A-23 49 472, filed based on the priority of the U.S. application, Ser. No. 294,048 (applicant: Ford-Werke), discloses the preparation of a catalyst support consisting of silicon nitride and having through channels. A suspension is produced from silicon powder, a solvent and a plasticizing agent and a binder and is applied to a flat substrate of paper or textile fabric. The coated substrate is then preshaped in a corrugating apparatus, after which it is wound to form a cylindrical structure in such a way that the corrugations form gas passages through the structure. The organic material is then removed by heating in air, and finally the silicon is converted into silicon nitride in a nitriding furnace. This gives a product which is composed of a large number of linear channels and in which the channel walls have pores whose mean diameter is not more than about 3.5 $\mu$m. Formation of the pores takes place during the final firing process and therefore cannot be influenced to any great extent. Furthermore, the preparation and shaping of the starting material is expensive and inconvenient. In addition, the linear, elongated channel structure results in unfavorable flow behavior.

SUMMARY OF THE INVENTION

It is therefore the object of the invention to provide a material based on silicon powder reaction-bonded in the presence of carbon which overcomes the disadvantages of the prior art material.

It is another object of the invention to provide a material which can be readily prepared, is versatile, and has a larger pore diameter than the prior art materials and exhibits improved flow behavior, with regard to both liquids and gases.

These and related objects are achieved by a material which is characterized by a skeleton of reaction-bonded silicon, which skeleton has an open-cell pore structure produced by using a matrix of an appropriately shaped polyurethane foam structure, which matrix is then eliminated in a later heat treating step.

Foams based on polyurethane which have a suitable open-cell pore structure which can be used as a substrate for the shaping procedure are known and are commercially available. They are produced and sold by, for example, Recticell (Iserlohn, FRG). The porosity (open pores) of such foams can be up to 90 percent. Preferably, foams having a mean pore diameter of 0.1 to 10 mm are used. Although they are not commonly used at present, it is also possible to use foams having larger pores. With foams having a mean pore diameter of less than 0.1 mm, a uniform coating of the pore structure can, as a rule, only be achieved with difficulty, if at all. In principle, it is possible to use rigid as well as flexible and resilient foams. The choice of foams is governed, in most cases, on the basis of better suitability, by the particular coating method chosen, such as, for example, immersion, suction or pouring, or by the method subsequently used to remove excess coating material.

The pore structure of the matrix is coated and saturated using a suspension which has been prepared from silicon powder, synthetic resin and a volatile solvent or solvent mixture and whose viscosity is not more than about 10 Pa.s. Experience has shown that, with higher viscosities, coatings can be applied in the required uniformity and in an acceptable time only with difficulty, if at all. It has been found advantageous to use suspensions whose viscosity is between 0.1 and 10 Pa.s., although in principle, it is possible to use mixtures of lower viscosity.

The suspension is advantageously prepared using silicon powder whose maximum particle size is in the range from 1 to 50 $\mu$m. Material in this particle size range can be classified and provided, for example, using a turbo classifier and then carrying out particle size analysis. The proportion of the silicon powder by weight in the suspension is advantageously 40 to 80 percent by weight, relative to the sum of silicon powder and silicone resin. The required purity of the silicon depends on the intended use of the product; thus, a considerably purer starting material will be required for use in the filtration of melts of solar grade silicon than, for example, in the filtration of aluminum melts which have a high content of foreign substances and where the purity is less important. In principle, silicon of any purity is suitable, from very pure silicon for the production of electronic components through metallurgical silicon, to alloyed silicon having a silicon content of about 65 percent by weight.

Synthetic resins suitable for the suspension are those capable of at least partial hardening when the solvent is removed, so that they ensure bonding of the silicon particles to one another, on the one hand, and to the substrate and its pore structure, on the other hand. This precondition is fulfilled by many known and commercially available silicone resins, such as, for example, the product from Wacker-Chemie GmbH, sold under the name METHYLSILICONHARZ MK. It is also possible to use silicone resins which undergo at least partial crosslinking on hardening. Silicone resins which have proven particularly suitable for this purpose are those in which the ratio of the Si-C bonds to the Si-O or Si-N bonds is between 1 and 1.5, as, for example, in the case of the product from the above-mentioned company sold under the name POLYSILAZANHARZ B571. It should be borne in mind that, as a rule, a certain proportion of the oxygen and/or nitrogen introduced in this matter remains in the end product. In order to ensure that, in the subsequent heat treatment, the remaining carbon content remains small, silicone resins essentially containing methyl or ethyl groups as organic radicals are advantageously used.

The solvents or solvent mixtures used are the known organic liquids which dissolve silicone resins, that is to say preferably aromatics, such as benzene, toluene or, in particular, xylene. It is also possible to use liquid aliphatic hydrocarbons, for example, petroleum ether, ligroin or cyclohexane, or alcohols, such as methanol, ethanol or propanol, or other organic solvents, such as acetone, provided that they are capable of dissolving the selected silicone resin and can be readily removed again in the subsequent treatment step. Solvents or solvent mixtures whose boiling point is in the range from 50° to 130° C. are preferably used.

Phenol resol resins, which often have the advantage of being water-soluble and thus also permit the use of water as a solvent, are also suitable. In this case, expensive collecting apparatuses can be dispensed with in the step in which the solvent is removed.

The suspension is advantageously prepared by initially taking the solution of the selected synthetic resin, for example, a silicone resin, in the suitable solvent and introducing the required amount of silicon powder a little at a time, while stirring. Optionally, the viscosity can also be controlled by adding further solvent or resin solutions. However, in the event of pronounced dust formation, it may also be advantageous to cover the silicon powder taken initially with the liquid phase and then to mix the powder and liquid phase. The viscosity of the suspension can be checked, for example, by means of a falling ball viscometer or rotary viscometer.

There are various suitable methods for coating the foam matrix, that is to say the open-cell pore structure forming its inner surface. For example, particularly with coarse-pore structures or with rigid foams, the foam can be immersed in the suspension, thoroughly impregnated, and then removed. The excess material can be allowed to drip off, so that the foam surface surrounding the pores is covered as completely as possible with the suspension. Particularly with flexible and resilient foam, it has proven useful initially, to impregnate the foams with the suspension utilizing, if necessary, its suction effect. The excess material is then removed by pressing it out, for example, by means of rollers acting on both sides or by spinning. Another possible method comprises allowing the suspension to initially flow through the foam matrix until the pores are coated to a sufficient extent.

The completeness of the coating can be estimated by comparison of the initial and final weight of the foam, so that coating can be repeated if the weight increase is insufficient. In general, it has proven sufficient if the weight increase indicates about 80 percent coating of the pore structure. Experience has shown that the film thicknesses achieved in a coating process are about the size of the silicon particles and amount to about 2 to 100 μm. Greater film thicknesses can be obtained by carrying out several coating processes in succession, the film applied previously being allowed to dry, at least superficially, in each case. In such coating sequences, it is also possible to use different suspensions.

In the next process step, the foam provided with a coating is dried in order to remove solvent residues, and at the same time the resin is allowed to at least partially harden, so that the adhesion of the silicon particles to the pore structure is improved and the embedding of the particles in the resin is stabilized. In order to prevent uncontrolled release of any volatile organic solvents used into the surrounding air, this process is advantageously carried out in a closed drying system, for example, in a vacuum chamber or a drying oven where the solvents removed can be collected. To facilitate removal of the solvent, the process can also be carried out under the action of heat, as a rule, a temperature increase up to the boiling range of the solvent being sufficient. However, the temperature may be increased further into the softening range of the resin, with the result that, if required, the coating can be made uniform and stabilized.

The solvent-free material obtained in this matter is then subjected to a heat treatment, during which the organic components, i.e., the polyurethane foam matrix structure and the hardened resin, decompose and are, for the most part, expelled. The remaining residues, that is to say essentially carbon with proportions of oxygen and/or nitrogen, contribute to reaction-bonding of the silicon structure, which structure in its final form, corresponds to the predetermined shape of the matrix substrate structure. The heat treatment takes the form of a temperature increase, and the rate of increase can be kept constant or can be varied. Rates of increase of 0.5° to 20° C. per minute are advantageously maintained. Initially, the range from 200° to 600° C., in which decomposition and expulsion of the organic components take place, is important. If oxidizing conditions are employed in this range, the carbon present volatilizes in the form of its oxides, and only a small proportion of typically, between 0.1 to 1 percent by weight, remains in the solid phase. Under inert conditions, the organic components are carbonized, and the carbon content in the solid phase may be up to 10 percent by weight, relative to silicon. In principle, both procedures are possible. In each case, the rate of temperature increase in this phase should be adjusted so that the decomposition reactions taking place do not lead to destruction of the silicon skeleton. It may sometimes also be necessary to keep the temperature constant in the stated range for a certain time. The time finally required for this step is advantageously determined by means of preliminary experiments.

The temperature is then further increased, the final value being in the range from 1300° to 1550° C. From about 1200° C., substantial stabilization of the silicon skeleton occurs, this stabilization probably is the result of reaction-bonding with the participation of the foreign elements carbon, oxygen and/or nitrogen which may be present. A stable product is obtained if the heat treatment is carried out in a nitrogen atmosphere at least at 1200° C. or higher. Even in this low temperature range, stabilization can evidently be supported by additional reaction with the gas phase with formation of nitride phases. A product for which the heat treatment has been carried out at temperatures reaching out beyond the melting point of the silicon, that is to say about 1420° C., is distinguished by particular stability. Presumably, this is due to the interaction of the phases formed in the course of the process, probably carbide and/or nitride and/or oxynitride phases, with one another and with the remaining silicon.

The residence times required for reacton-bonding are advantageously determined by means of preliminary experiments. As a rule, they are considerably prolonged if it is intended to achieve substantial conversion of the silicon skeleton to the nitride by reaction with a nitrogen atmosphere.

The silicon skeleton of the material obtainable by this process, which skeleton is reaction-bonded and present in an open-cell pore structure, can be provided with surface coatings in a further step. Suitable methods being both the application of additional layers and the modification of the existing surface, for example, by reaction in a suitable atmosphere under appropriate temperature conditions with the formation of silicon carbide, nitride or oxynitride. An additional layer can be produced, for example, by brief immersion in molten silicon or by gas-phase deposition of a surface layer of elemental silicon. Another possible method consists, inter alia, in applying a hydrolyzable organosilicon compound, such as, for example, tetraethoxysilane, and converting this into a silicon dioxide coating by hydrolysis and heat treatment. The coating can, in general, be both in the form of an individual component and in the form of a mixture or mixed phase of several components.

Because of its high thermal and chemical stability and thermal shock resistance, the material obtained is outstanding as a filter medium for liquids, in particular, for the filtration of metal melts, especially of aluminum. It can advantageously be employed for the filtration of semiconductor materials and, remarkably, also for silicon, for example, to separate off remaining slag particles from the melt after a slag extraction step.

The material also has a particularly advantageous effect when used in combustion apparatuses as a boundary medium between the flame zone and unignited combustible mixture. In this respect, not only is it distinguished by a long service life, but it also results in particularly good mixing of the ignitable mixture and, because of the highly turbulent flow, also a particularly effective combustion process with regard to heat efficiencies.

The material is also outstanding as a carrier for catalysts. Coating the ceramic material with titanium dioxide is a good example. Because of its high thermal stability, the material thus obtained can be employed as a catalyst in denitrification plants. Excellent results are also obtained in the heat treatment of articles where uniform heating and uniform admission of the furnace atmosphere are important. Here the articles to be treated are surrounded by the material according to the invention, for example, in the manner of a shaft or of a chamber. In this case, the open-cell pore structure results in very uniform passage of heat to the surrounded articles.

Any shaping steps required can be carried out both on the substrate provided for shaping, that is to say the polyurethane foam matrix, and on the ready-prepared ceramic material or on the intermediate material.

The invention will now be described in further detail with reference being made to the following examples. It should, however, be recognized that the examples are given as being illustrative of the present invention and are not intended to define the spirit and scope thereof.

EXAMPLE 1

250 ml of a silicone resin solution which contained 50 percent by weight of xylene as a solvent and 50 percent by weight of methylsilicone resin (type MK, manufacturer Wacker-Chemie) were prepared. 264 g of silicon powder (Si content 99.99999 percent by weight, mean particle size 7 μm) was introduced into this solution, while stirring, and the stirring was continued until a homogeneous mixture was obtained. The viscosity of this suspension was determined by means of a rotary viscometer and was about 280 mPa.s.

A square piece of polyurethane foam (manufacturer Recticell) which was about 20 mm thick and had an edge length of about 50 mm and an open-cell pore structure (pore diameter of about 1 to 1.5 mm) was then placed in the suspension, thoroughly impregnated, and then pressed out with the aid of a pile of rolls (nip about 5 mm). The product was then introduced into a drying oven and dried there for about 30 minutes at 90° C. The weight increase measured thereafter was about 17 g, which corresponded to about 75 percent coating of the foam structure. The coating process was then repeated in an analogous manner, and the impregnated foam was dried again after being pressed out, a temperature of about 250° C. being maintained for about 24 hours. The total weight increase determined thereafter was about 29 g, and the product exhibited complete coating of the pore structure on visual examination.

After this pre-treatment, the molding thus obtained was placed in an oven at room temperature, into which a nitrogen atmosphere was then introduced. The temperature was then increased to a value of 1280° C. at a constant rate of increase of about 50° C./h and kept at this value for about 10 hours. Thereafter, the temperature was further increased, once again at a rate of 50° C./h, until a temperature of 1450° C. was reached. After a residence time of 5 hours, the temperature was increased once again to 1530° C. at the same rate of increase, and the oven was switched off after a residence time of about 15 minutes. The product was allowed to cool in the oven and then removed. The weight was about 25.2 g, corresponding to a density of about 0.5 g/cm$^3$, and the pore diameter was between 1 and 1.5 mm.

Investigations of the product with the aid of scanning electron microscopy and by means of an X-ray diffractometer showed that a felt-like silicon dioxide/silicon oxynitride layer had formed on the surface of the pores.

The resulting ceramic material having an open-cell pore structure was then fastened, as a sort of frit base, in a graphite tube provided with a funnel. This arrangement was then heated to about 1500° C. in an argon atmosphere in a vacuum unit and was used for pouring a prepared melt of about 1.5 kg. of silicon purified by extraction treatment with calcium silicate slag (Ca content about 5000 atom-ppm) into a graphite crucible. During the pouring process, the entire melt flowed through the material, which showed absolutely no signs of attack afterwards. The melt obtained was free of silicate particles; its calcium content after the filtration was less than 500 atom-ppm.

EXAMPLE 2

A further sanple was prepared in exactly the same manner as described in Example 1; the substrate used was a polyurethane foam having an open-cell pore structure and a pore diameter of 0.5–0.7 mm. and the external dimensions 100×40×20 mm³, the remaining process parameters remaining unchanged.

The product obtained was fastened in a holder and then installed, as a boundary medium between the flame zone and 1 unignited combustible mixture, in an experimental combustion apparatus for the combustion of natural gas/air mixtures. The unit was operated with a basic gas throughput of 10 1/h of natural gas and 100 1/h of air; this could be varied within a regulating range of 1:18. In conventional jet burners, this value is only 1:10. Because of the high thermal shock resistance of the material, the burner could also be subjected for two months to a cycle in which it was switched on and off 4 times per hour, without any material problems occurring.

No upstream mixing unit was required for mixing the combustion gases, and the combustion process took place uniformly over the entire surface. The low flame temperatures furthermore results in low $NO_x$ content in the exhaust gases.

EXAMPLE 3

About 500 g of crude silicon (Si content about 96 percent by weight, mean particle size about 2 μm) was covered with a previously prepared solution of about 250 g of phenol resol resin in about 250 g of demineralized water and then mixed by means of a stirrer until a homogeneous suspension had formed. The viscosity of this suspension was about 400 mPa.s.

Several polyurethane foam molds to be used as the matrix (pore size about 1–1.5 mm, thickness about 20 mm) were then immersed in this mixture, impregnated, and allowed to drip off. The moldings were cut to size so that they could be assembled to form a cubic element which enclosed a cubic cavity having an edge length of about 30 mm. After the excess had dripped off, the molds were examined visually for uniform coating of the pores and, optionally, after further immersion and dripping, dried for about 5 hours in a drying oven kept at 100° C.

Thereafter, the intermediate products were placed in an oven at room temperature, into which an argon atmosphere was introduced. The temperature was then increased at a constant rate of about 30° C./h. Observation of the combustion process showed that decomposition of the organic material (carbonization) began from about 200° C. and started to decline at about 500° C. The temperature increase was continued up to a value of about 1400° C.; the oven was kept at this temperature for about 24 hours and finally switched off. The ceramic articles removed after cooling proved to be mechanically stable and could be assembled again to form the cube without additional processing steps.

Thermocouples for measuring the temperature distribution during heating processes were then mounted at various points in the interior of the cube. The cube was then placed in an oven and its temperature gradually increased to about 1000° C. Both during the temperature increase and during the subsequent holding phase and subsequent cooling phases, the temperature distribution in the interior of the cube was found to be substantially more uniform compared with the normal oven atmosphere. Thus, the heating effect on articles surrounded by the material according to the invention is considerably more uniform than when these articles are exposed merely to the oven atmosphere. It is therefore outstanding for use in the heat treatment of articles which require very uniform heating, for example, varistores based on zinc oxide.

While only several examples of the present invention have been described, it is obvious that many changes and modifications may be made thereunto, without departing from the spirit and scope of the invention.

What is claimed is:

1. A ceramic material based on silicon powder reaction-bonded in the presence of carbon containing carbon from 0.1 to 10 percent by weight, relative to silicon, comprising:
   a skeleton of reaction-bonded silicon having an open-cell pore structure with a pore size of 0.1 to 10 mm to permit the passage of fluids therethrough, said open-cell structure produced by coating a polyurethane matrix with silicon powder and thereafter expelling the polyurethane matrix by heating.

2. The material, as set forth in claim 1, wherein a coating of a member selected from the group consisting of silicon, silicon carbide, silicon dioxide, silicon nitride, silicon oxynitride, and a combination thereof is applied to said skeleton.

3. A filter for the filtration of liquids, particularly melts of metals or semiconductor material comprising:
   a ceramic material based on silicon powder reaction-bonded in the presence of carbon containing carbon from 0.1 to 10 percent by weight, relative to silicon, having a skeleton of reaction-bonded silicon having an open-cell pore structure with a pore size of 0.1 to 10 mm to permit the passage of fluids therethrough, said open-cell structure produced by coating a polyurethane matrix with silicon powder and thereafter expelling the polyurethane matrix by heating.

4. A carrier for catalytically active coatings, comprising:
   a ceramic material based on silicon powder reaction-bonded in the presence of carbon containing carbon from 0.1 to 10 percent by weight, relative to silicon, having a skeleton of reaction-bonded silicon having an open-cell pore structure with a pore size of 0.1 to 10 mm to permit the passage of fluids therethrough, said open-cell structure produced by coating a polyurethane matrix with silicon powder and thereafter expelling the polyurethane matrix by heating.

5. A carrier for articles which are subjected to a heat treatment, comprising:
   a ceramic material based on silicon powder reaction-bonded in the presence of carbon containing carbon from 0.1 to 10 percent by weight, relative to silicon, having a skeleton of reaction-bonded silicon having an open-cell pore structure with a pore size of 0.1 to 10 mm to permit the passage of fluids therethrough, said open-cell structure produced by coating a polyurethane matrix with silicon powder and thereafter expelling the polyurethane matrix by heating.

6. Boundary medium in combustion apparatuses acting as a boundary medium between the flame zone and unignited combustible mixture, comprising:
   a ceramic material based on silicon powder reaction-bonded in the presence of carbon containing carbon from 0.1 to 10 percent by weight, relative to silicon, having a skeleton of reaction-bonded silicon having an open-cell pore structure with a pore size of 0.1 to 10 mm to permit the passage of fluids therethrough, said open-cell structure produced by coating a polyurethane matrix with silicon powder and thereafter expelling the polyurethane matrix by heating.

7. The ceramic material, as set forth in claim 1,
wherein the skeleton of silicon is reaction-bonded at 1300° C. to 1550° C.; and
wherein expelling the polyurethane matrix is by heating to 200° C. to 600° C.

8. The filter for the filtration of liquids, as set forth in claim 4,
wherein the skeleton of silicon is reaction-bonded at 1300° C. to 1550° C.; and
wherein expelling the polyurethane matrix is by heating to 200° C. to 600° C.

9. The carrier for catalytically active coatings, as set forth in claim 5,
wherein the skeleton of silicon is reaction-bonded at 1300° C. to 1550° C.; and
wherein expelling the polyurethane matrix is by heating to 200° C. to 600° C.

10. The carrier for articles which are subjected to a heat treatment, as set forth in claim 6,
wherein the skeleton of silicon is reaction-bonded at 1300° C. to 1550° C.; and
wherein expelling the polyurethane matrix is by heating to 200° C. to 600° C.

11. The boundary medium, as set forth in claim 7,
wherein the skeleton of silicon is reaction-bonded at 1300° C. to 1550° C.; and
wherein expelling the polyurethane matrix is by heating to 200° C. to 600° C.

* * * * *